(12) United States Patent
Danner

(10) Patent No.: US 8,525,483 B2
(45) Date of Patent: Sep. 3, 2013

(54) CONTROL OF BATTERY CHARGING POWER

(75) Inventor: Carl Lee Danner, Bakersfield, CA (US)

(73) Assignee: Carl Lee Danner, Bakersfield, CA (US)

( * ) Notice: Subject to any disclaimer, the term of this patent is extended or adjusted under 35 U.S.C. 154(b) by 238 days.

(21) Appl. No.: 13/088,429

(22) Filed: Apr. 20, 2011

(65) Prior Publication Data

US 2012/0268076 A1 Oct. 25, 2012

(51) Int. Cl.
*H01M 10/46* (2006.01)

(52) U.S. Cl.
USPC ........................................................ 320/138

(58) Field of Classification Search
USPC ................. 320/103, 107, 112, 114, 116, 122, 320/137, 138
See application file for complete search history.

(56) References Cited

U.S. PATENT DOCUMENTS

| | | | |
|---|---|---|---|
| 5,404,090 A * | 4/1995 | Shinbori | 307/66 |
| 7,411,371 B2 * | 8/2008 | Hobbs | 320/128 |
| 7,414,332 B2 * | 8/2008 | Ohsuga | 307/80 |
| RE41,675 E * | 9/2010 | Liu et al. | 320/107 |
| 7,844,370 B2 * | 11/2010 | Pollack et al. | 700/291 |
| 2003/0184934 A1 * | 10/2003 | Bushue et al. | 361/62 |

* cited by examiner

Primary Examiner — Edward Tso

(57) ABSTRACT

In a first embodiment multiple power sources are selected and then combined. Selecting power rather than controlling power may be a cheaper way of controlling the amount of power delivered. In a second embodiment the logic to control power is removed from the battery charger so that the logic may be changed when a different battery is being charged. This permits all types of batteries to be charged if the power source is compatible with the battery. Other embodiments expand the types of power sources that may be used.

8 Claims, 5 Drawing Sheets

CONTROL OF BATTERY CHARGING POWER

FIELD OF THE INVENTION

This invention relates to batteries, and more particularly to an improved method of charging batteries.

BACKGROUND OF THE INVENTION

Prior art battery chargers use only on power source. Different power levels require complex source power modifying equipment.

It is, therefore, an object of the present invention to provide a less complex method of providing different power levels by selecting power from a combination of available power sources rather than modifying power from a single source.

Prior art battery chargers decide what power to supply to the battery. Frequently the charger has no way of knowing that a new type battery is being charged. This system is expensive because if a new type battery is being charged then some method needs to be developed to let the charger know that a new battery is being charged, also the charger may need to be reprogrammed to supply the correct power.

It is therefore a further object of the present invention to move the battery charging decisions out of the battery charger.

Prior art battery chargers decide what power to supply to the battery. The charger must know how to charge many battery types if many types of batteries are charged. This makes battery chargers expensive.

It is therefore a further object of the present invention to simplify charging decisions by associating battery charging decisions with the battery being charged. The decision-making logic may only need to know how to charge one type of battery.

Prior art battery chargers must use large and expensive power modifying modules if the Battery charger is to charge high capacity batteries. These modules are very expensive.

It is therefore a further object of the present invention to not use power modifying modules. Instead, power is controlled by selecting a high power source when high power is needed.

Prior art battery chargers frequently are only able to charge a limited number of battery types and sizes. It is therefore a further object of the present invention to provide a battery charger that can charge all types of batteries now existing or that may exist in the future. The framework to do this is provided in the current invention. Versatile power delivery methods, data delivery methods, communication protocols etc. are needed. There are many and varied ways of solving these problems.

SUMMARY OF THE INVENTION

In accordance with these and other objects of the invention, there is provided in a first embodiment more than one power source. A combination of these sources is selected. Power from the selected source or sources is combined to give a power that is appropriate to the battery being charged. There is provided remote sensing of battery status and identification but the battery has no control over how it is charged.

In a second embodiment there is provided a single power source. The power level of this single source is controllable. A logic device that is located separately from the source controls the power. The battery can control how it is being charged if this logic device is located with the battery.

In a third embodiment there are provided multiple power sources. The power level is controllable by selecting various combinations of sources and combining them into one charging power. A logic device that is located separately form the sources controls the power. The battery can control how it is being charged if this logic device is located with the battery.

A forth embodiment is a combination of the second and third embodiments. There are provided multiple power sources and at least one variable power source. The power level is controllable by selecting various combinations of sources and combining them into one charging power.

Thus one aspect of the invention contemplates battery charging that is similar to prior art except in as multiple selectable power sources are used. Another aspect of the invention uses power sources that can be remotely controlled by the battery being charged. The power sources may be multiple selectable, controllable, or a combination of multiple selectable and controllable.

BRIEF DESCRIPTION OF THE DRAWINGS

The foregoing and other objects and features of the present invention can be more readily understood with reference to the following detailed description, taken in conjunction with the accompanying drawings, wherein like reference numerals designate like electrical elements and in which:

FIG. 1 shows a first plug being used. FIG. 2 shows a second plug.

DETAILED DESCRIPTION OF THE INVENTION

Although the improved battery charger of the present invention is described herein with reference to use in an electric vehicle by way of example, it is to be clearly understood that the principles of the invention are applicable to providing power to other types of electric equipment. The invention has been described in connection with batteries because they are a worst-case situation. Batteries are varied because they perform in many different environments for many different purposes, and therefore it should be obvious that the principles of the invention can easily be applied to other types of equipment.

Figure 1:
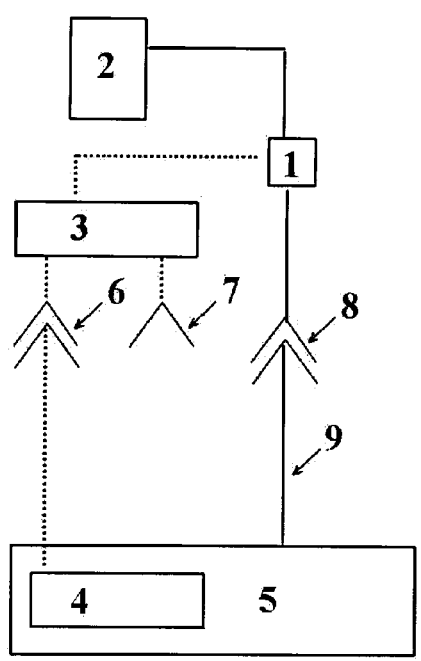
FIGS. 1 and 2 are prior art drawings that are shown so as to help illustrate the differences between prior art and the current invention. They show a battery charger that locates the charge control logic in the charger. Many chargers use separate bays or plugs for each type battery as a method of identifying which type battery is being charged.
Figure 2:
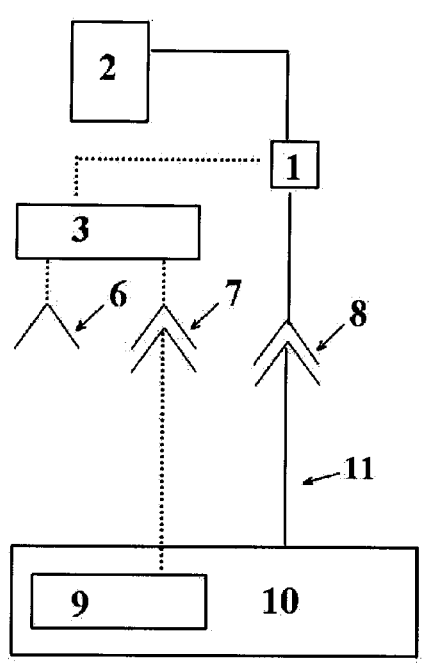

Referring now to FIG. 1 of the drawings, a block diagram of a battery charger that is using prior art technology is shown. This is being done so that the improvements of the present invention can be more easily understood as compared to prior art. Power source 1 is created from main power feed 2. A logic device 3 receives information 4 via a jack and plug connection 6. Jack 7 is not being used at this time. In a typical prior art design batteries of different sizes will fit into slots and the positive battery connection serves as the information jack 6 used to measure battery voltage. The logic device 3 sends signals to source 1 so as to control battery charging power 9. In FIG. 2 a battery having different charging power characteristics is plugged into logic device jack 7. The battery charge controller 7 receives information 9 from battery 10. Logic device 3 has been programmed to work with source 1 so as to give battery 10 a charging power 11. Battery charging power 11 is different than battery charge power 9 of FIG. 1 because it was created using sensor information from a different type battery and also the sensor information was plugged into a different jack 7 on the logic device 3. The source power 1 is adjusted according to logic device 3 decisions based partly on the fact that sensor information is coming in at jack 7 rather than jack 6. The logic is different for information arriving via jack 6. This prior art method limits the number of type batteries that can be charged by source 1 to the number of inputs to the logic device 3. This could be quite large if more inputs were used. Another limitation is that there is only one battery logic device 3. If a new type battery were to be used with this charger then logic device 3 would need to be replaced or reprogrammed.

Figure 3:
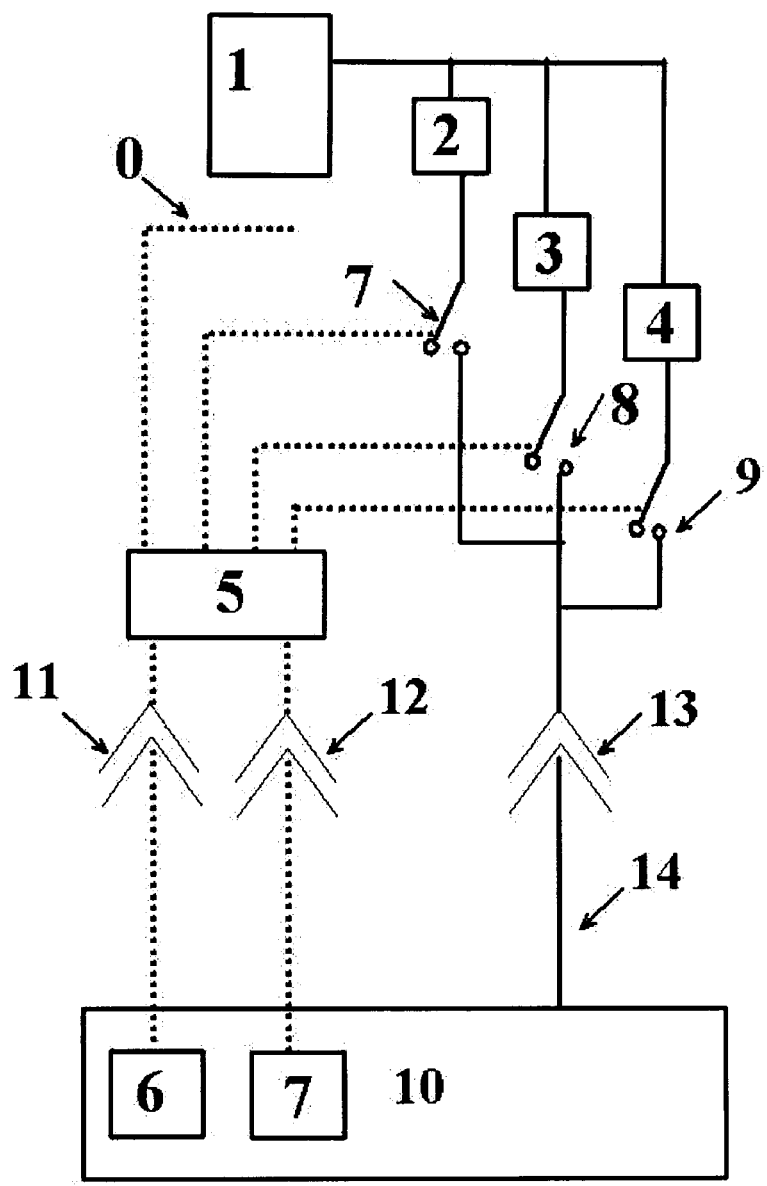
FIG. 3 shows one embodiment of the present invention that uses selectable multiple power sources which is one aspect of the present invention. The charge control logic is prior art since it is located on the source side of the battery charger.

Referring now to FIG. 3 of the drawings, a block diagram of a battery charger is shown with a first exemplary embodiment of the improved battery charger constructed in accordance with the present invention. Several power sources are created from a main power feed 1. A logic device 5 receives sensor information 6 and battery identification information 7 from battery 10. The logic device 5 sends signals to source selection devices 7, 8, and 9 so as to control battery-charging power 14 by selecting various combinations of sources 2, 3, and 4. Note source selection 0. It is not connected to a source. Let's assume that it should be. If logic device 5 does not know that selection 0 is bad then it will deliver incorrect power to battery 10. The logic device 5 source selection signals (dotted lines connecting logic device 5 to source selection devices 7, 8, and 9) should also be paired with source status information so logic device 5 knows that the desired source is available and operating within specs. Many types of batteries can be charged with this first exemplary embodiment because sensor information 6 world tell the logic device something about the battery condition. Also many battery identification numbers 7 could be used so the logic device would be able to use the information from sensor 6 to charge each battery to best advantage. However, the logic device 5 is located on the power source side of jacks 11 and 12 so this embodiment suffers from the limitation of putting the logic device 5 in the battery charger. This limitation is that the battery charger will not be able to correctly charge a battery if the logic device 5 does not recognize the battery identification number at 7.

Figure 4:
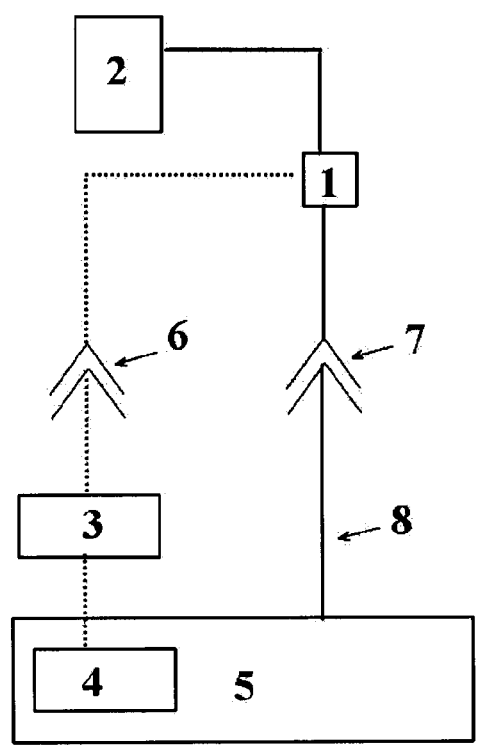
FIGS. 4 and 5 show a variable power source that is being controlled by a logic device that is external to the power source. The logic device could be located in an electric vehicle.

FIG. 4 of the drawings is a block diagram of a battery charger with a second exemplary embodiment of the improved battery charger constructed in accordance with the present invention. A controllable power source is created from a main power feed 2. A logic device 3 receives sensor information 4 from battery 10. The battery identification of FIG. 3 number 7 is not needed because the logic device 3 is located on the battery side of plug 6. This means that logic device 3 can stay with battery 5. If logic device 3 is only used with battery 5 then no battery identification is needed. The logic device 3 sends signals to controllable source 1 so as to control battery-charging power 8. Many types of batteries can be charged with this second exemplary embodiment because a different logic device may be used with each type battery. This is shown in FIG. 5.

Figure 5:
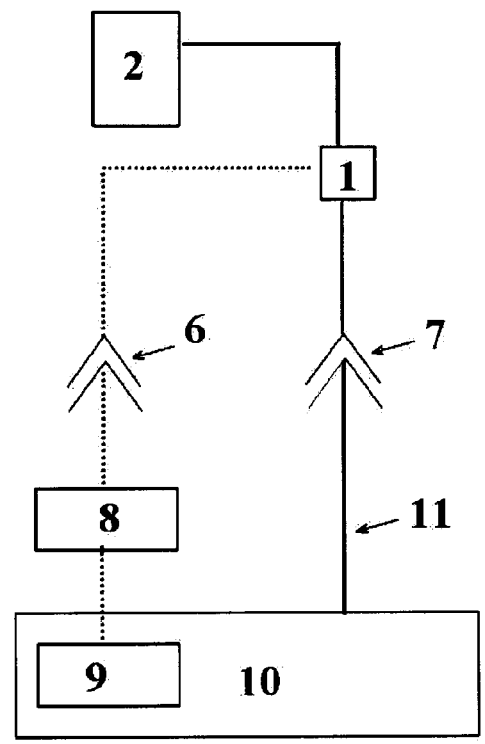

FIG. 5 is identical to FIG. 4 except a different logic device is used so as to provide battery 10 with a different charging power 11. Thus this secondary embodiment can charge many types of batteries. There are limitations. If a battery has a higher voltage than source 1 then the battery will not be able to be charged. Logic device 8 must use the same source control signals as FIG. 4 logic device 3. It will take a long time to charge battery 10 if it is a large high power battery and source 1 has relatively low power.

Figure 6:
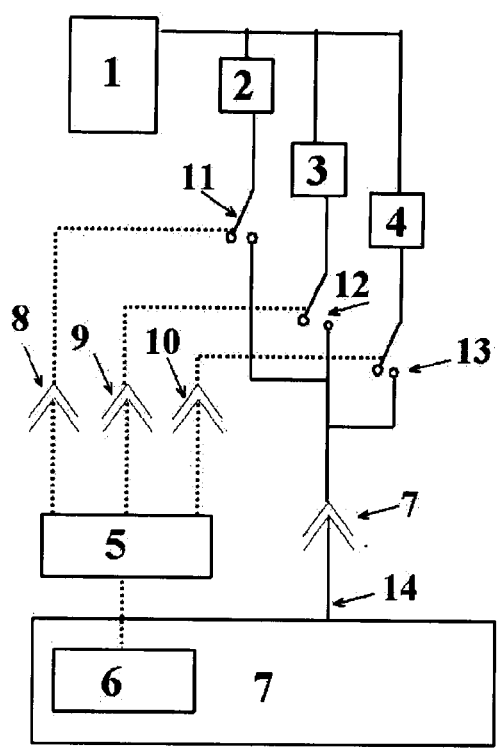
FIGS. 6 nd 7 show multiple sources that are selected by a control device that could be located in an elctric vehicle. Multiple selectable sources may be a cheaper method of controlling the amount of power.
Figure 7:
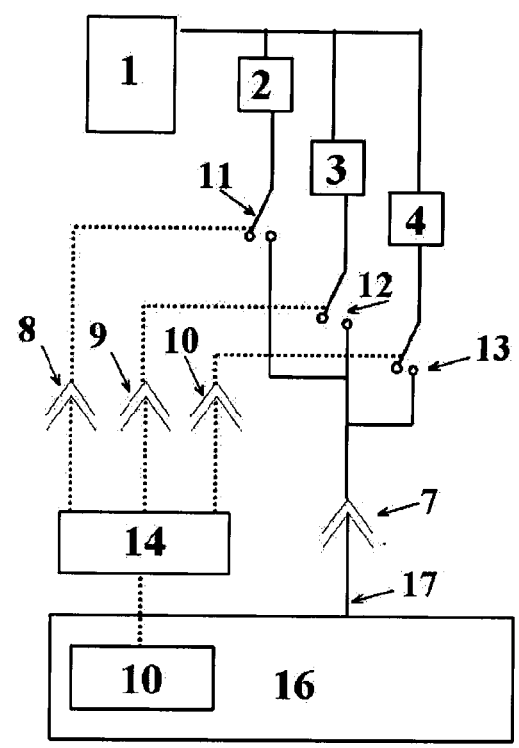

FIG. 6 of the drawings is a block diagram of a battery charger with a third exemplary embodiment of the improved battery charger constructed in accordance with the present invention. Selectable power sources 2, 3, and 4 are created from a main power feed 1. A logic device 5 receives sensor information 6 from battery 7. The battery identification of FIG. 3 number 7 is not needed because the logic device 5 is located on the battery side of plugs 8, 9, and 10. This means that logic device 5 can stay with battery 7. If logic device 5 is only used with battery 7 then no battery identification is needed. Logic device 5 Sends signals that select a combination of sources 2, 3, and 4 using selection devices 11, 12, and 13 so as to control battery-charging power 14. Many types of batteries can be charged with this second exemplary embodiment because a different logic device may be used with each type battery. This is shown in FIG. 7. FIG. 7 is identical to FIG. 6 except a different logic device 14 is used so as to provide battery 16 with a different charging power 17. Thus this third embodiment can charge many types of batteries. There are limitations. If a battery has a higher voltage than the highest voltage source then the battery will not be able to be charged. Logic device 14 must use the same source control signals as FIG. 6 logic device 5. It will take a long time to charge battery 16 if it is a large high power battery and the total power of sources 2, 3, and 4 is relatively low. That is the reason selectable sources are used. Each source is cheap to make because it is just a simple power source with no power control circuitry other than the source selection device.

Figure 8:
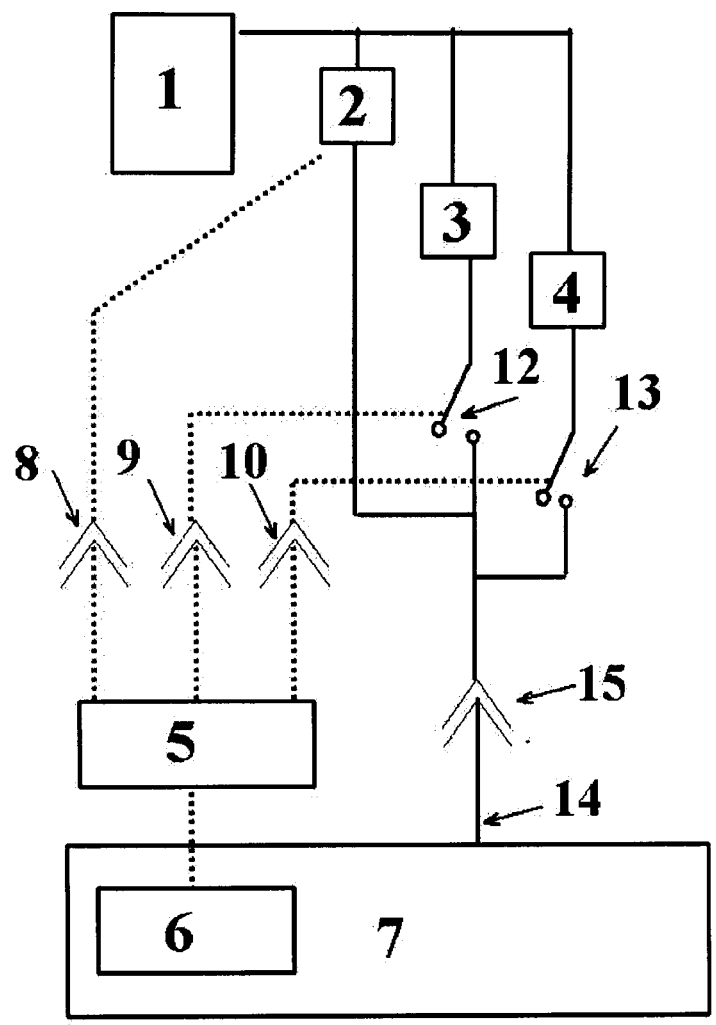
FIG. 8 shows a variable source that is combined with multiple sources. The variable source will make it possible to more accurately control the amount of power. The variable sources would be higher power and may be a cheaper way of providing high power.

FIG. 8 is identical to FIG. 6 except one source is controllable instead of selectable. It may be advantageous to have one power source that is continuously variable since some batteries require a smaller current to finish charging. A power source that is only selectable and not variable may not be able to provide the exact power level that is needed. Source 2 has been made controllable rather than selectable. Logic device 5 will need to be able to control this controllable source. The dotted lines in all figures above represent control or battery status signal lines. These lines go from a battery to a power source. These lines should use an electrically non-conductive medium in order to minimize electric shock hazard. It should be understood that although the invention has been described with reference to providing power to a battery, it is contemplated that the principles of the current invention may be applied to providing power to other types of equipment. Furthermore, it is contemplated that the principles of the invention may be employed to provide power other than to batteries or electric vehicles. Use of the present invention with large mining equipment or other electric powered machinery may allow for more efficient control of power. Thus there have been shown and described various power sources and arrangements of power sources that allow flexible control of electric power by multiple separate power consuming equipments. It is to be understood that the above-described embodiments of the invention are merely illustrative of the many possible specific embodiments, which represent applications of the principle of the present invention. Numerous and varied other arrangements can be readily devised in accordance with these principles by those skilled in the art without departing form the spirit and scope of the invention.

What is claimed is:

1. A battery charger comprising:
   a plurality of electric power sources created from a main electric power feed;
   means to deliver power from said plurality of electric power sources to a battery;
   means to select a combination of said plurality of electric power sources;
   a logic device controlling said source selection means;
   means to provide status information of said battery to said logic device;
   means to provide identification of said battery to said logic device.

2. A battery controllable charger comprising:
   means to create a controllable electric power source from a main power feed;
   means to deliver power from said controllable electric power source to a battery being charged;
   means to provide a first battery status information about a battery to a first logic device;
   said first logic device controlling said controllable electric power source so said controllable electric power source provides an acceptable charging power to a first battery based on said first battery status information;
   means to replace said first battery with a second battery;
   said first logic device controlling said controllable electric power source so said controllable electric power source provides power that damages said second battery;
   means to replace said first logic device with a second logic device;
   said second logic device controlling said controllable electric power source so as to deliver an acceptable charging power to said second battery based on said second battery status information.

3. A battery controllable charger comprising:
   a plurality of selectable electric power sources created from a main electric power feed;
   means to deliver power from said plurality of electric power sources to a battery;
   source selection means;
   means to provide a first status information about a first battery to a first logic device capable of selecting a combination of said plurality of selectable electric power sources so as to deliver an acceptable charging power to said first battery based on said first status information;
   means to replace said first battery with a second battery;
   said first logic device selecting a combination of said plurality of selectable electric power sources so as to deliver charging power that damages said second battery;
   means to replace said first logic device with a second logic device;
   means to provide a second status information about said second battery to said second logic device capable of selecting a combination of said plurality of selectable electric power sources so as to deliver an acceptable charging power to said second battery based on said status information.

4. The power sources of claim 3 wherein one or more sources is controllable so as to deliver a continuously variable power;
   logic devices capable of controlling said one or more power sources.

5. The battery charger of claim 1 wherein said main power source is an alternating current power source;
   alternating current to direct current means located in the electric power path between said alternating current power source and the battery being charged.

6. The battery controllable charger of claim 2 wherein said main power source is an alternating current power source;
   alternating current to direct current means located in the electric power path between said alternating current power source and the battery being charged.

7. The battery controllable charger of claim 3 wherein said main power source is an alternating current power source;
   alternating current to direct current means located in the electric power path between said alternating current power source and the battery being charged.

8. The battery controllable charger of claim 4 wherein said main power source is an alternating current power source;
   alternating current to direct current means located in the electric power path between said alternating current power source and the battery being charged.

* * * * *